United States Patent [19]

Wu et al.

[11] Patent Number: 4,986,225
[45] Date of Patent: Jan. 22, 1991

[54] INTAKE RESERVOIR SYSTEM FOR AN ENGINE HAVING A CHECK VALVE

[75] Inventors: Ko-Jen Wu, Troy; Richard S. Davis, Romeo, both of Mich.

[73] Assignee: General Motors Corporation, Detroit, Mich.

[21] Appl. No.: 534,990

[22] Filed: Jun. 8, 1990

[51] Int. Cl.⁵ .......................................... F02M 35/10
[52] U.S. Cl. ................................................ 123/52 MF
[58] Field of Search ......... 123/52 M, 52 MV, 52 MB, 123/52 MC, 52 MF, 52 ML

[56] References Cited

U.S. PATENT DOCUMENTS

| | | | |
|---|---|---|---|
| 3,810,454 | 5/1974 | Hunt | 123/52 MF |
| 3,995,609 | 12/1976 | Klomp | 123/188 S |
| 4,232,641 | 11/1980 | Curtil | 123/76 |
| 4,409,949 | 1/1983 | Tanaka et al. | 123/571 |
| 4,422,416 | 12/1983 | Bernardoni | 123/52 MF |
| 4,512,152 | 4/1985 | Asaba | 60/601 |
| 4,517,947 | 5/1985 | Nishikawa et al. | 123/52 MF |
| 4,538,555 | 9/1985 | Kite | 123/52 MB |
| 4,760,703 | 8/1988 | Minami et al. | 60/605.1 |
| 4,773,358 | 9/1988 | Heath | 123/52 MF |
| 4,928,639 | 5/1990 | Schatz | 123/52 MF |

FOREIGN PATENT DOCUMENTS

| | | |
|---|---|---|
| 3417526 | 5/1985 | Fed. Rep. of Germany ........ 123/52 MF |
| 3714049A1 | 11/1987 | Fed. Rep. of Germany . |
| 0160514 | 9/1983 | Japan . |
| 0889878 | 12/1981 | U.S.S.R. . |

Primary Examiner—David A. Okonsky
Attorney, Agent, or Firm—Gordon F. Belcher

[57] ABSTRACT

An intake reservoir system is for an engine having an intake passage leading to a cylinder, and a check valve in the intake passage to allow fluid flow toward the cylinder and obstruct fluid back-flow in the reverse direction. A bypass port is located on the intake passage so that the bypass port communicates with a trapped volume defined by the portion of the intake passage between the check valve and cylinder. The intake reservoir system comprises an inflower for enabling fluid to flow into the trapped volume when the pressure therein is at least equal to the pressure upstream of the check valve. The intake reservoir system further comprises a reservoir cavity, a port passage connected between the reservoir cavity and bypass port enabling communication between the reservoir cavity and trapped volume, and a volume controller enabling adjustment of the volume of the reservoir cavity.

7 Claims, 2 Drawing Sheets

INTAKE RESERVOIR SYSTEM FOR AN ENGINE HAVING A CHECK VALVE

TECHNICAL FIELD

This invention relates to an engine having a check valve in an intake passage leading to a cylinder in the engine and an intake reservoir system connected to the intake passage downstream of the check valve to allow fluid flow between the intake reservoir system and the intake passage downstream of the check valve.

BACKGROUND

A check valve can be located in an intake passage leading to a cylinder in an engine to obstruct back-flow of fluid out of the cylinder into the intake passage. In such an arrangement, a trapped volume is defined by the portion of the intake passage between the check valve and cylinder.

Increasing the pressure in the trapped volume prior to the intake of air into the cylinder (i.e., prior to an intake portion of the engine cycle) can improve engine performance since such increased pressure can reduce the work of the engine required to draw air into the cylinder. Also, increasing the pressure in the trapped volume prior to an intake portion can resist back-flow of exhaust gas from the cylinder into the trapped volume. The pressure in the trapped volume prior to an intake portion is typically at least equal to the pressure upstream of the check valve.

The pressure in the trapped volume can be increased by allowing communication between the trapped volume and cylinder during the exhausting of exhaust gas from the cylinder (i.e., during an exhaust portion of the engine cycle) resulting in exhaust gas flowing from the cylinder back into the intake passage and reentering the cylinder during the next intake portion. The pressure in the trapped volume can also be increased by allowing communication between the trapped volume and cylinder during, for example, the compression of air in the cylinder (i.e., during a compression portion of the engine cycle) resulting in some of the fluid in the cylinder flowing back into the intake passage and reentering the cylinder during the next intake portion. In both cases, the check valve obstructs fluid back-flow further into the intake passage and the pressure in the trapped volume increases.

The pressure in the trapped volume prior to an intake portion can be further affected by locating a port on the intake passage so that the port communicates with the trapped volume, and connecting a chamber having a fixed volume to the port to allow communication between the chamber and trapped volume. The effective volume of the trapped volume is thereby increased by an amount approximately equal to the volume of the chamber. The chamber may have an additional inlet to enable fluid, such as air, to flow into the chamber to further affect the pressure therein.

Such arrangements, however, can employ a chamber having a fixed volume. This can limit control of the pressure in the trapped volume prior to an intake portion. The optimum pressure in and the optimum volume of the trapped volume prior to an intake portion can vary depending on the operating condition of the engine.

SUMMARY OF THE INVENTION

The present invention provides an intake reservoir system for an engine having an intake passage leading to a cylinder, and a check valve in the intake passage to allow fluid flow toward the cylinder and obstruct fluid back-flow in the reverse direction. A bypass port is located on the intake passage so that the bypass port communicates with a trapped volume defined by the portion of the intake passage between the check valve cylinder. The intake reservoir system comprises inflow means for enabling fluid to flow into the trapped volume when the pressure therein is at least equal to the pressure upstream of the check valve. The intake reservoir system further comprises a reservoir cavity, a port passage connected between the reservoir cavity and the bypass port enabling communication between the reservoir cavity and trapped volume, and a volume control means enabling adjustment of the volume of the reservoir cavity.

The fluid flow into the trapped volume when the pressure therein is at least equal to the pressure upstream of the check valve enables an increase in the pressure in the trapped volume before an intake portion. The connection of the intake reservoir system to the trapped volume and the adjustability of the volume of the reservoir cavity enables adjustment of the effective volume of the trapped volume. This enables controlled increases in the pressure in the trapped volume prior to an intake portion over a wide range of engine operating conditions. This enables improvements in engine performance over a wide range of engine operating conditions since the optimum pressure in and the optimum volume of the trapped volume can vary depending on the engine operating condition.

These and other features and advantages of the invention will be more fully understood from the following description of certain specific embodiments of the invention taken together with the accompanying drawing.

BRIEF DRAWING DESCRIPTION

In the drawing:

FIG. 1 is a schematic view showing the intake reservoir system of the present invention connected to an engine; and FIG. 2 is a schematic view showing a second embodiment of the volume control means shown in FIG. 1.

DETAILED DESCRIPTION

Figure 1:
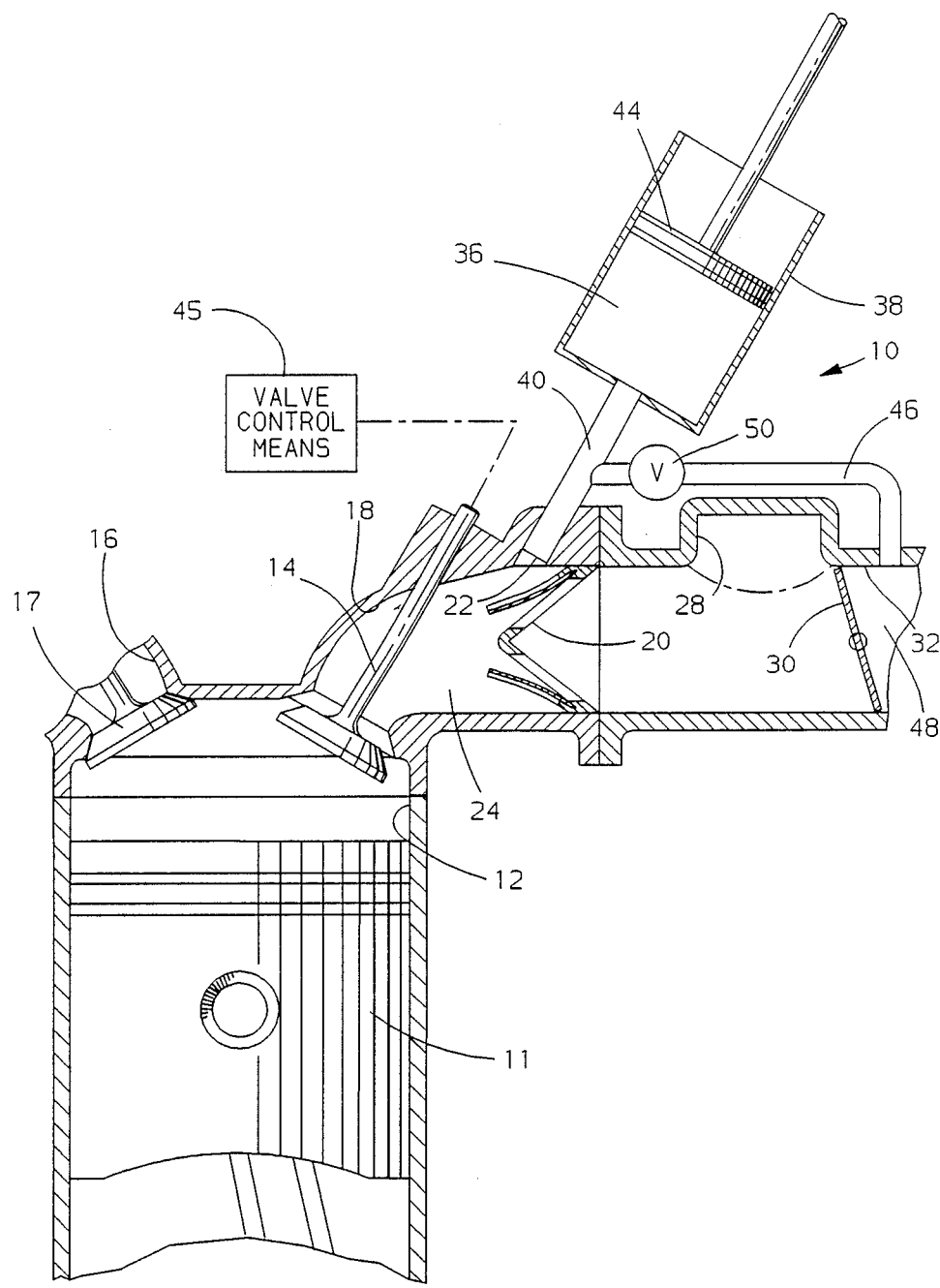

Referring now to FIG. 1 in detail, numeral 10 generally refers to an intake reservoir system of the present invention connected to an engine. The engine includes a piston 11 disposed in a cylinder 12, an intake passage 18 leading to the cylinder, and an exhaust passage 16 leading away from the cylinder. A check valve 20, such as a reed valve, is located in the intake passage 18. The check valve 20 allows fluid flow toward the cylinder 12 and obstructs fluid back-flow in the reverse direction.

An intake valve 14 may be seated in the intake passage 18 between the check valve 20 and the cylinder 12. An exhaust valve 17 may be seated in the exhaust passage 16.

A bypass port 22 is located on the intake passage 18 so that the bypass port communicates with a trapped volume 24 defined by the portion of the intake passage between the check valve 20 and cylinder 12.

The check valve 20 is preferably located as close to the cylinder 12 as possible to reduce the minimum size of the trapped volume 24. For a typical cylinder head, the volume of the trapped volume 24 can be as small as 15 percent of the piston-swept volume of the cylinder 12.

A plenum 28 is connected to the inlet of the intake passage 18 and a throttle valve 30 is located in a throttle passage 32 leading to the plenum 28. The throttle valve 30 may also be located between the plenum 28 and check valve 20, or between the check valve 20 and intake valve 14 upstream of the bypass port 22.

Although FIG. 1 shows a single cylinder 12, the intake reservoir system of the present invention may also be used with a multi-cylinder engine. The intake reservoir system 10 may also be used with multi-valve, rotary valve, rotary or two-stroke engines.

The intake reservoir system 10 comprises a housing 38 having a generally elongate interior wall, such as that of a cylinder. A volume control means includes a reservoir piston 44 having an edge which sealingly engages the interior wall of the housing 38 so that a reservoir cavity 36 is defined by the portion of the interior wall of the housing 38 between one end thereof and the head of the reservoir piston.

The intake reservoir system 10 further comprises a port passage 40 having one and connected to the bypass port 22. The other end of the port passage 40 is connected to the one end of the interior wall of the housing 38 to enable communication between the reservoir cavity 36 and the port passage. This enables communication between the reservoir cavity 36 and the trapped volume 24.

The reservoir piston 44 is displaceable along the length of the interior wall of the housing 38 to enable adjustment of the volume of the reservoir cavity 36. The displacement of the reservoir piston 44 can be controlled by a variety of actuators including an electrical actuator, such as a stepper motor, or a hydraulic or vacuum actuator. The actuator can be controlled by an electronic control module for the engine.

The intake reservoir system 10 comprises an inflow means for enabling fluid to flow into the trapped volume 24 when the pressure therein is at least equal to the pressure upstream of the check valve 20. The inflow means can comprise a valve control means 45, such as a camshaft, connected to the intake valve 14. The valve control means 45 is adapted to cause the intake valve 14 to be open during a portion of the engine cycle when the pressure in the cylinder 12 is larger than the pressure in the trapped volume 24 allowing fluid to flow from the cylinder back into the trapped volume. Such a portion of the engine cycle can be during a period when the intake and exhaust valves 14, 17 are open simultaneously or when the intake valve is open during a compression portion.

The inflow means can also include a secondary passage 46 connected between the secondary fluid source 48 and the port passage 40 to enable communication between the secondary fluid source and reservoir cavity 36, and between the secondary fluid source and trapped volume 24. The secondary passage 46 can also be connected between the secondary fluid source 48 and the trapped volume 24 or reservoir cavity 36. The secondary fluid source 48 is constituted by the air in the region of the throttle passage 32 adjacent the throttle valve 30 and opposite the plenum 28. The pressure of the air in this region of the throttle passage 32 is approximately atmospheric. Other secondary fluid sources are also possible.

The secondary passage 46 allows secondary air to flow into the reservoir cavity 36 and trapped volume 24 when the pressure therein is at least equal to the pressure upstream of the check valve 20. The secondary air flow into the reservoir cavity 36 and trapped volume 24 increases the pressure in the trapped volume thereby reducing the work of the engine required to draw air into the cylinder 12. In addition, the increased pressure in the trapped volume 24 can resist back-flow of exhaust gas from the cylinder 12 into the trapped volume.

A control valve 50, such as a valve controlled by a solenoid, can be disposed in the secondary passage 46 to enable ajustment of the size of its flow area. The air flow through the secondary passage 46 into the reservoir cavity 36 and trapped volume 24 can thereby be controlled.

It is possible for the inflow means to comprise either the valve control means 45 or the secondary passage 46, without combining the two.

Ordinarily, during high engine loads, the reservoir piston 44 is moved toward the end of the housing 38 adjacent the port passage 40 to decrease the size of the reservoir cavity 36. During partial engine loads, the reservoir piston 44 is moved away from the end of the housing 38 adjacent the port passage 40 to increase the size of the reservoir cavity 36.

Figure 2:
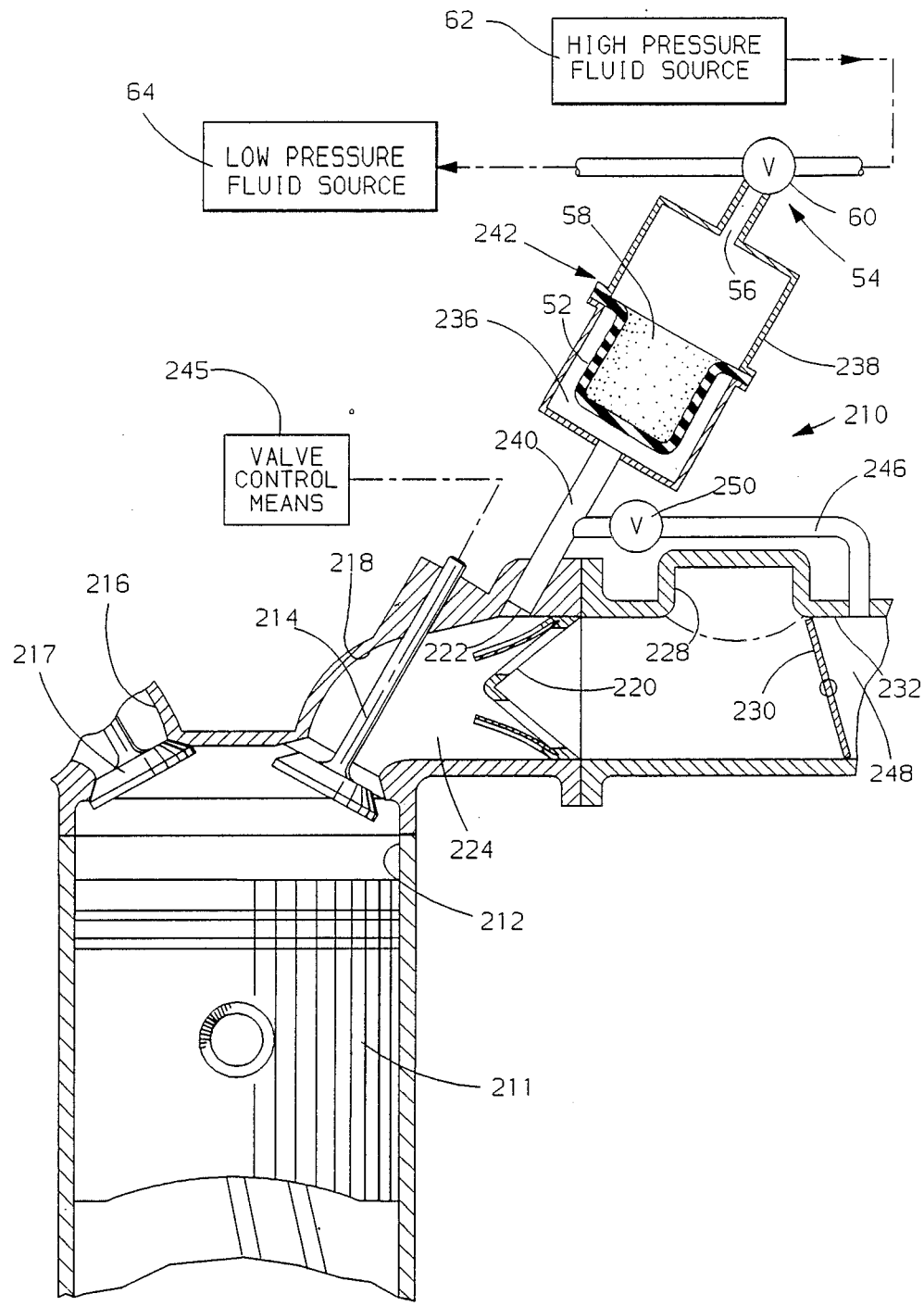

An alternative volume control means is shown schematically in FIG. 2. Parts similar to those shown in FIG. 1 have the same reference numeral with the addition of the prefix 200. In this embodiment, the volume control means comprises a flexible membrane 52, such as a rubber diaphragm, sealingly connected to a perimeter of the interior wall of the housing 238 so that the reservoir cavity 236 is defined by a portion of the interior wall between one end thereof and the membrane. The port passage 240 is connected to the one end of the interior wall of the housing 238 to enable communication between the reservoir cavity 236 and the port passage.

The volume control means further comprises a pressure regulator 54 connected to a control port 56 in the housing 238 and communicating with a control cavity 58 in the housing adjoining the membrane 252. The pressure regulator 54 may comprise a regulator valve 60 connected to the control port 56 and a high pressure fluid source 62 connected to the regulator valve. The high pressure fluid source 62 can contain gas, such as air, or liquid, such as hydraulic fluid. The regulator valve 60 can regulate communication between the high pressure fluid source 62 and the control cavity 58 thereby enabling controlled increases in the pressure therein. A low pressure fluid source 64 may also be connected to the regulator valve 60 to enable venting of the control cavity 58 into the low pressure fluid source, with the regulator valve regulating the venting. The pressure in the control cavity 58 can thereby be increased or decreased by controlling communication between it and the high and low pressure fluid sources 62, 64 via the regulator valve 60. The regulator valve 60 can be controlled by an electronic control module for the engine.

Increasing the pressure in the control cavity 58 produces displacement of the membrane 52 toward the port passage 240 thereby decreasing the volume of the reservoir cavity 236. Decreasing the pressure in the control cavity 58 causes displacement of the membrane 52 away from the port passage 240 thereby increasing the volume of the reservoir cavity 236.

While the invention has been described by reference to certain preferred embodiments, it should be understood that numerous changes could be made within the spirit and scope of the inventive concepts described. Accordingly, it is intended that the invention not be limited to the disclosed embodiments, but that it have the full scope permitted by the language of the following claims.

The embodiments of the invention in which an exclusive property or privilege is claimed are defined as follows:

1. An intake reservoir system for an engine having an intake passage leading to a cylinder, a check valve in the intake passage to allow fluid flow toward the cylinder and obstruct fluid back-flow in the reverse direction, and a bypass port located on the intake passage so that the bypass port communicates with a trapped volume defined by the portion of the intake passage between the check valve and cylinder, the intake reservoir system comprising inflow means for enabling fluid to flow into the trapped volume when the pressure therein is at least equal to the pressure upstream of the check valve, the intake reservoir system further comprising a reservoir cavity, a port passage connected between said reservoir cavity and the bypass port enabling communication between said reservoir cavity and the trapped volume, and a volume control means enabling adjustment of the volume of said reservoir cavity.

2. An intake reservoir system as set forth in claim 1, and further comprising a housing having a generally elongate interior wall, said volume control means comprising a reservoir piston sealingly engageable with said interior wall so that said reservoir cavity is defined by the portion of said interior wall between one end thereof and said reservoir piston, said port passage being connected to said one one of said interior wall to enable communication between said reservoir cavity and port passage, said reservoir piston being displaceable along the length of said interior wall to enable said adjustment of said volume of said reservoir cavity.

3. An intake reservoir system as set forth in claim 1, and further comprising a housing having an elongate interior wall, said volume control means comprising a flexible membrane sealingly connected to a perimeter of said interior wall so that said reservoir cavity is defined by a portion of said interior wall between one end thereof and said membrane, said port passage being connected to said one end of said interior wall to enable communication between said reservoir cavity and said port passage, said volume control means further comprising a pressure regulator being connected to said housing and communicating with a control cavity in said housing adjoining said membrane, said pressure regulator being adapted to adjust the pressure in said control cavity to produce displacement of said membrane with respect to said port passage thereby enabling said adjustment of said volume of said reservoir cavity.

4. An intake reservoir system as set forth in claim 1 wherein said inflow means enables communication between the trapped volume and cylinder during a portion of the engine cycle when the pressure in the cylinder is larger than the pressure in the trapped volume allowing fluid to flow from the cylinder back into the trapped volume.

5. An intake reservoir system as set forth in claim 1 and further comprising an intake valve seated in the intake passage between the check valve and the cylinder, wherein said inflow means comprises a secondary passage leading from a secondary fluid source to the trapped volume enabling communication therebetween.

6. An intake reservoir system for an engine having an intake passage leading to a cylinder, a check valve in the intake passage to allow fluid flow toward the cylinder and obstruct fluid back-flow in the reverse direction, and a bypass port located on the intake passage so that the bypass port communicates with a trapped volume defined by the portion of the intake passage between the check valve and cylinder, the intake reservoir system comprising inflow means for enabling fluid to flow into the trapped volume when the pressure therein is at least equal to the pressure upstream of the check valve, a housing having a generally elongate interior wall, a reservoir piston sealingly engageable with said interior wall so that said reservoir cavity is defined by the portion of said interior wall between one and thereof and said reservoir piston, and a port passage connected to said one end of said interior wall to enable communication between said reservoir cavity and port passage, said reservoir piston being displaceable along the length of said interior wall to enable adjustment of the volume of said reservoir cavity.

7. An intake reservoir system for an engine having an intake passage leading to a cylinder, a check valve in the intake passage to allow fluid flow toward the cylinder and obstruct fluid back-flow in the reverse direction, and a bypass port located on the intake passage so that the bypass port communicates with a trapped volume defined by the portion of the intake passage between the check valve and cylinder, the intake reservoir system comprising inflow means for enabling fluid to flow into the trapped volume when the pressure therein is at least equal to the pressure upstream of the check valve, a housing having an elongate interior wall, a flexible membrane sealingly connected to a perimeter of said interior wall so that said reservoir cavity is defined by a portion of said interior wall between one and thereof and said membrane, a port passage connected to said one end of said interior wall to enable communication between said reservoir cavity and port passage, and a pressure regulator connected to said housing and communicating with a control cavity in said housing adjoining said membrane, said pressure regulator being adapted to adjust the pressure in said control cavity to produce displacement of said membrane with respect to said port passage thereby enabling adjustment of the volume of said reservoir cavity.

* * * * *